US008673205B2

(12) United States Patent
De Mattia

(10) Patent No.: US 8,673,205 B2
(45) Date of Patent: Mar. 18, 2014

(54) PROCESS FOR MANUFACTURING A PIECE THAT IS MADE OF COMPOSITE MATERIAL AND DEVICE FOR ITS IMPLEMENTATION

(75) Inventor: Denis De Mattia, Basse Goulaine (FR)

(73) Assignee: Airbus Operations S.A.S., Toulouse (FR)

(*) Notice: Subject to any disclaimer, the term of this patent is extended or adjusted under 35 U.S.C. 154(b) by 193 days.

(21) Appl. No.: 13/093,086

(22) Filed: Apr. 25, 2011

(65) Prior Publication Data
US 2011/0260375 A1    Oct. 27, 2011

(30) Foreign Application Priority Data
Apr. 23, 2010  (FR) ...................................... 10 53104

(51) Int. Cl.
*B29C 70/44* (2006.01)
(52) U.S. Cl.
USPC ........... 264/571; 264/544; 264/547; 264/552; 264/102; 425/503; 425/504; 425/387.1; 425/388; 425/389; 156/285; 156/196; 156/381
(58) Field of Classification Search
USPC ......... 264/500, 519, 544, 547, 548, 552, 571; 264/101, 102; 156/285, 196, 381, 242; 425/503, 504, 387.1, 388, 389, 405.1
See application file for complete search history.

(56) References Cited
U.S. PATENT DOCUMENTS
5,242,651 A * 9/1993 Brayden et al. ............... 264/510
5,635,013 A * 6/1997 Boi .............................. 156/285

OTHER PUBLICATIONS

Campbell, F.C. (2006). "Manufacturing Technology for Aerospace Structural Materials". Elsevier. Chapter 7 "Polymer Matrix Composites". Pertinent pp. 282-286,307-322.*
Campbell, F.C. (2006). "Manufacturing Technology for Aerospace Structural Materials". Elsevier. Chapter 7 "Polymer Matrix Composites". Pertinent pp. 282-286, 307-322.*
"Curing: It's a matter of time (t), temperature (T) and pressure (P)", In: F. C. Campbell: "Manufacturing processes for advanced composites", 2004, pp. 175-221, Elsevier, Oxford, XP002606673.
French Search Report, dated Dec. 8, 2010, in FR 1053104.

* cited by examiner

*Primary Examiner* — Joseph S Del Sole
*Assistant Examiner* — Lawrence D Hohenbrink, Jr.
(74) *Attorney, Agent, or Firm* — Young & Thompson

(57) ABSTRACT

A process for manufacturing a piece made of composite material that includes fibers that are immersed in a resin matrix, whereby the piece is placed in a first chamber with at least one flexible wall. The process includes a thermal cycle with essentially a first phase (50) at a first temperature during which the resin is liquid or in the "gel" state, and then a second phase (52) at a second temperature that is higher than the first during which solidification of the piece takes place by polymerization of the resin. An external pressure is applied to the outside of the first chamber and an internal pressure is generated inside the first chamber, wherein during the first phase (50), the relative internal pressure is less than 0 during a first period, and then greater than 0 during a second period preceding the beginning of the polymerization for reducing the porosity rate.

19 Claims, 2 Drawing Sheets

PROCESS FOR MANUFACTURING A PIECE THAT IS MADE OF COMPOSITE MATERIAL AND DEVICE FOR ITS IMPLEMENTATION

BACKGROUND OF THE INVENTION

1. Field of the Invention

This invention relates to a process for manufacturing a piece that is made of composite material as well as a device for its implementation.

2. Description of the Related Art

Aeronautical construction tends to resort to composite materials for the production of certain parts of an aircraft, for example for producing panels that form the outside skin of the fuselage, so as to reduce the on-board weight.

The pieces that are made of composite material comprise a resin matrix that is reinforced by fibers. According to one widely used embodiment, the fibers come in the form of one or more fold(s) that may or may not be woven, pre-impregnated with thermosetting resin, and stacked on one another in a predetermined order and with predetermined fiber directions. As a variant, the fibers cannot be pre-impregnated. In this case, at least one resin film is used.

To ensure the consolidation of the piece that is made of composite material, it is necessary to increase the temperature to achieve the polymerization of the resin.

This invention relates more particularly to an operating mode that consists in using a compacting bladder and an autoclave for the polymerization. Such a manufacturing process that is applied to a part of an aircraft fuselage that is made of composite material is described in the document FR-2,894,869 or US-20090020645.

Figure 1:
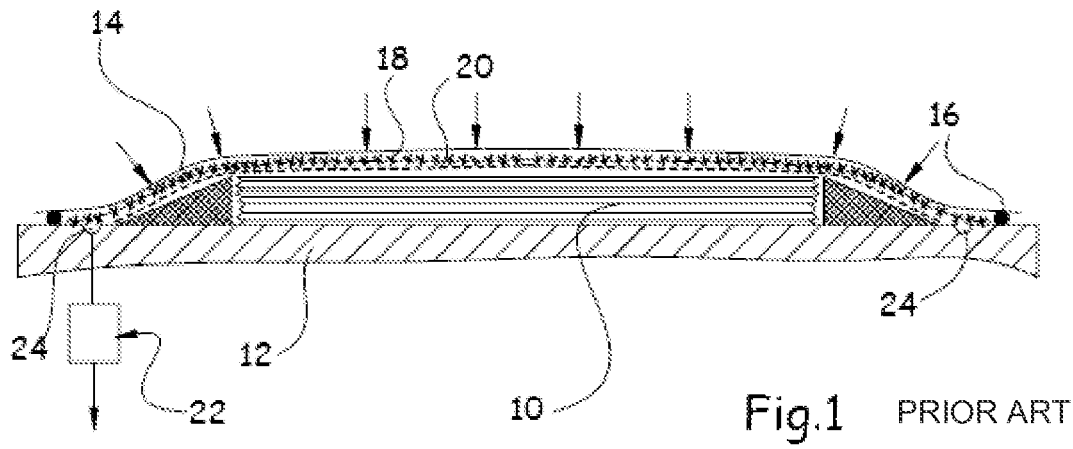

FIG. 1 shows a device of the prior art. The piece that is made of composite material that is connected to an airtight device 12 and that is covered by a compacting bladder 14 is shown at 10, whereby a joint 16 ensures the seal between the device 12 and the compacting bladder on the periphery of the piece 10. A draining fabric 18 is inserted between the piece 10 and the bladder 14. In addition, a non-perforated film 20, making it possible to let the gases pass through but retaining the resin during polymerization, is inserted between the piece 10 and the draining fabric 18. Means 22 are provided to put under vacuum the volume that is delimited by the device 12, the compacting bladder 14, and the joint 16, whereby said means 22, by way of example, comprise at least one channel 24 or at least one opening that is provided close to the peripheral joint 16.

This unit is then subjected to a polymerization cycle in an autoclave by applying external pressure on the order of 7 bar (8 bar of absolute pressure) and a relative vacuum on the order of −0.75 to −0.85 bar.

This thermal cycle essentially comprises a first phase 26 with a temperature on the order of 135 to 150° C. during which the resin is liquid, and then a second phase 28 with a temperature on the order of 180° C. during which the polymerization of the resin takes place.

Figure 2:
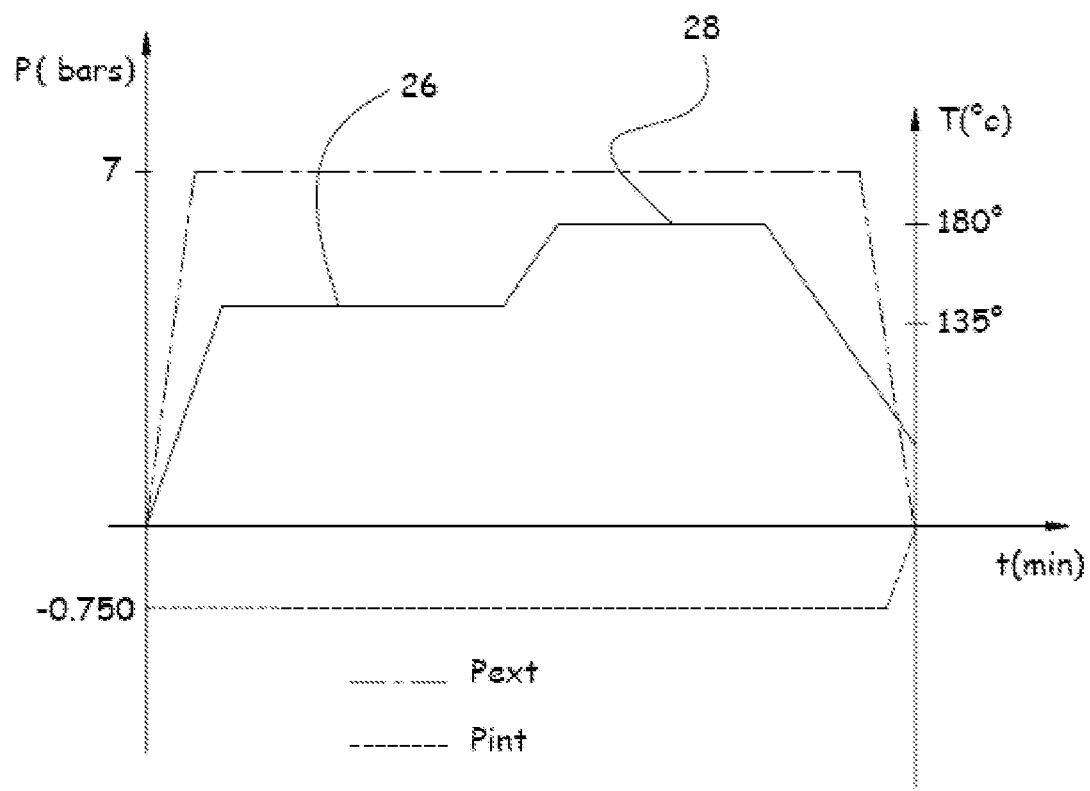

As illustrated in FIG. 2, a relative vacuum on the order of −0.85 bar, always less than 0 and essentially constant, is generated at the piece 10.

The application of the vacuum in the volume that is delimited by the device, the bladder and the joint makes possible the degassing of the entire cycle, which is reflected by minimal air enclosed while the external pressure ensures the maximum compacting of the piece that is reflected by a better rate of fibers.

Hereinafter, porosity rate is defined as the ratio of the volume of the pore sizes to the volume of the piece×100.

The porosity rate is an essential criterion that makes it possible to characterize the quality of a monolithic piece that is made of composite material with a resin matrix.

In fact, despite the care taken, porosities form during polymerization, and the porosity rate is often close to the acceptable limit on the order of 3% in the affected zones, which affected zones are to show less than 1% of the surface area of the piece.

In the least unfavorable case, by means of calculations of structure and exemptions, the piece can be used.

When the calculations show that the piece cannot withstand the required stresses, said piece is discarded.

The fact that the porosity rate is generally close to the acceptable limit and that procedures for calculation and exemption are necessary in this case makes manufacturing times difficult to predict.

To reduce the risks of porosities at the surface of the piece in contact with the bladder, the document FR-2,921,295 proposes an improved drainage system that comprises a plate with openings that is inserted between the draining fabric 18 and the non-perforated film 20.

SUMMARY OF THE INVENTION

The purpose of this application is to propose another solution that makes it possible to significantly reduce the porosity rate in the piece.

For this purpose, the invention has as its object a process for manufacturing a piece that is made of composite material that comprises fibers that are immersed in a resin matrix, whereby said piece is placed in a first chamber with at least one flexible wall, whereby said process comprises, on the one hand, a thermal cycle with essentially a first phase at a first temperature during which the resin is liquid and then changes to "gelling" (beginning of polymerization), and then a second phase at a second temperature that is higher than the first during which the solidification of the piece takes place by the advanced polymerization of the resin, and, on the other hand, an external pressure that is applied to the outside of the first chamber and an internal pressure that is generated inside the first chamber, characterized in that during the first phase, the relative internal pressure is less than 0 during a first period and then greater than 0 during a second period preceding the beginning of the polymerization for reducing the porosity rate.

BRIEF DESCRIPTION OF THE DRAWING FIGURES

Figure 3:
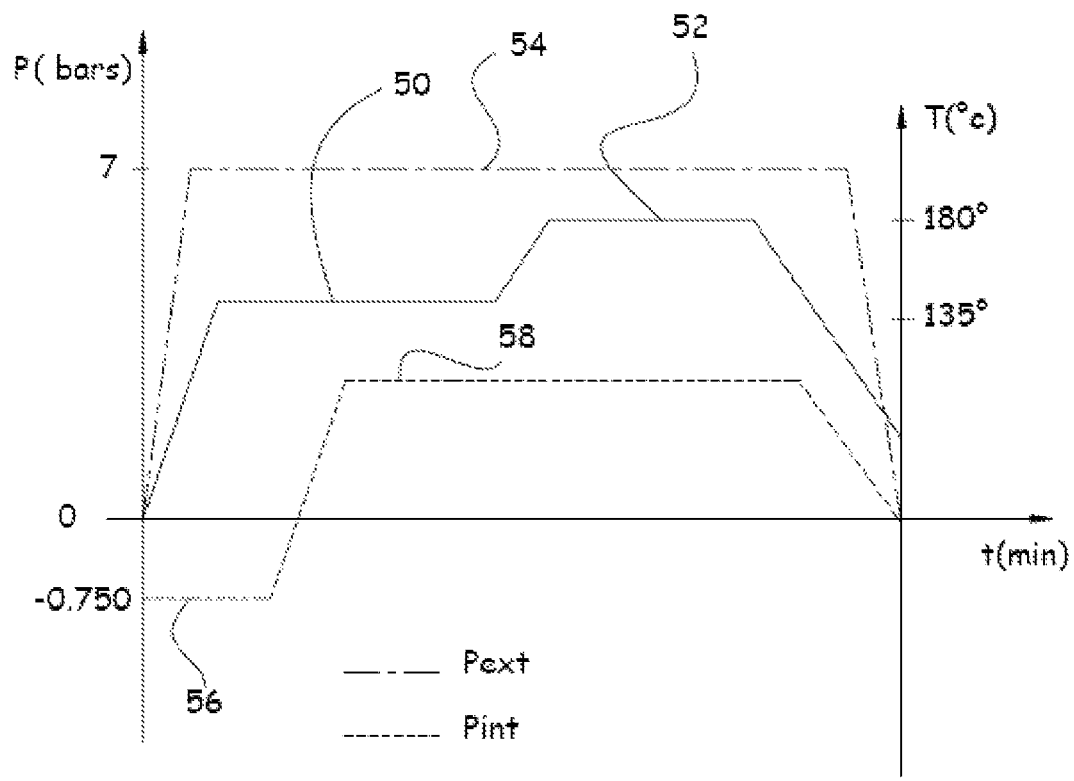
Figure 4:
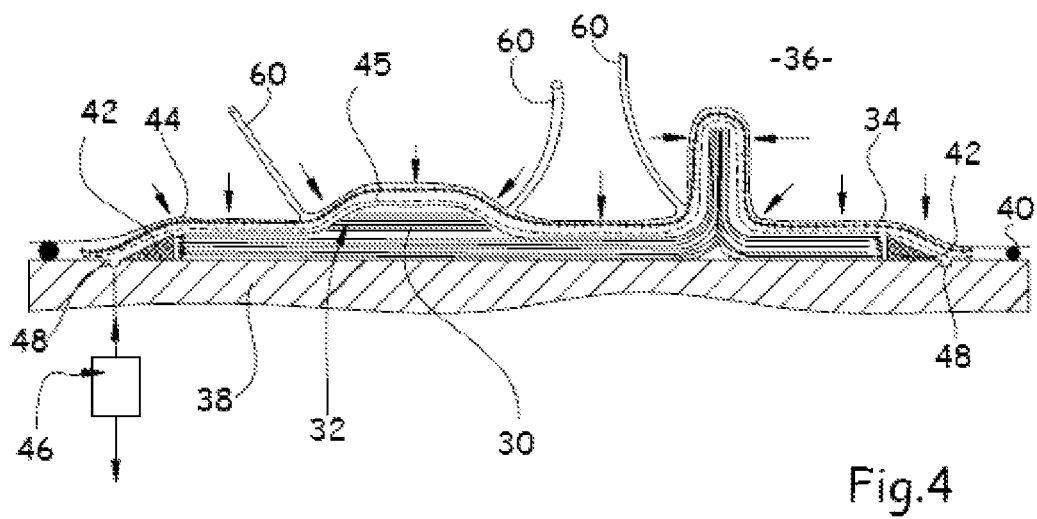

Other characteristics and advantages will emerge from the following description of the invention, a description that is provided only by way of example, relative to the accompanying drawings, in which:

FIG. 1 is a cutaway of a device for implementing a process for manufacturing a piece that is made of composite material, FIG. 2 is a diagram that illustrates a polymerization cycle according to the prior art, FIG. 3 is a diagram that illustrates a polymerization cycle according to the invention, and FIG. 4 is a cutaway of a variant of a device that makes it possible to implement the process according to the invention.

DETAILED DESCRIPTION OF THE INVENTION

At 30, FIG. 4 shows a piece that is made of composite material that is not polymerized or not completely polymerized.

In a known manner, the piece 30 comprises fibers that are immersed in a resin matrix. According to one embodiment, the fibers come in the form of one or more fold(s) that may or may not be woven, pre-impregnated with thermosetting resin, stacked on one another in a predetermined order and with predetermined fiber directions. As a variant, the fibers cannot be pre-impregnated. In this case, at least one resin film is used.

For the polymerization, the piece 30 is arranged in a polymerization device that comprises a first chamber 32 with at least one flexible wall 34, whereby the first chamber 32 is arranged in a second chamber 36.

According to one embodiment, the second chamber 36 is an autoclave in which a relative pressure on the order of 7 bar or an absolute pressure on the order of 8 bar is generated.

The pressure that is generated in the second chamber 36 makes possible—via the flexible wall 34—the maximum compacting of the piece 30 and therefore makes it possible to obtain a better rate of fibers.

According to one embodiment, the first chamber 32 comprises a rigid and airtight device 38, a bladder that ensures the function of the flexible wall 34, and advantageously a joint 40 that is inserted between the device 38 and the bladder 34.

Generally, a first surface of the piece is in contact with the device 38, whereas the opposing surface is in contact with the bladder 34, whereby the joint 40 extends on the periphery of the piece 30. At least one edge shim 42 can be provided on the periphery of the piece 30.

The device 38, the bladder 34, the joint 40, and the edge shim 42 are not described in more detail because they are known to one skilled in the art.

To limit the porosity and to evacuate the gases into the first chamber 32, the polymerization device comprises drainage means with at least one drainage fabric 44 that is inserted between the piece 30 and the bladder 34. Advantageously, a non-perforated film 45, making it possible to let the gases pass through but retaining the resin during polymerization, is inserted between the piece 30 and the draining fabric 44. In addition, the drainage means comprise means 46 for adjusting the pressure inside the first chamber 32 and preferably at least one drainage channel 48 ensuring the continuity between the drainage fabric 42 and the means 46 for adjusting the pressure inside the first chamber 32.

The drainage fabric 42, the non-perforated film 45, the means 46 for adjusting the pressure, and the drainage channel 48 are not described in more detail because they are known to one skilled in the art.

The polymerization cycle comprises, as illustrated in FIG. 3, a thermal cycle with essentially a first phase 50 at a first temperature, for example on the order of 135 to 150° C. during which the resin is liquid or in the "gel" state, and then a second phase 52 at a second temperature that is higher than the first, for example on the order of 180° C., during which the solidification of the piece takes place by the advanced polymerization of the resin.

During the polymerization cycle, a pressure 54 called an absolute external pressure on the order of 8 bar (relative pressure of 7 bar) is exerted in the second chamber 36, as illustrated in FIG. 3. This external pressure can be reached by different stages.

According to the invention, the internal pressure that is generated inside the first chamber 32 is not constant and during the first phase, it comprises a first period 56 during which the relative internal pressure is less than 0 or the absolute internal pressure is less than 1 bar, and then a second period 58 that extends for the entire phase of the polymerization during which the internal pressure is a counter-pressure with a relative value that is greater than 0 or an absolute value that is greater than 1 bar.

The purpose of the first period 56 is to reduce the quantity of gas enclosed in the piece 30.

During the second period 58, the resin is in the liquid state or in the "gel" state although its pressure inside the piece 30 is essentially uniform aside from the pressure drops. This counter-pressure makes it possible to reduce the size of the porosities and therefore the porosity rate.

The higher this counter-pressure is, the smaller the final porosity rate.

However, this counter-pressure is to be considerably lower than the external pressure so as to preserve the shape of the piece that is in contact with the bladder 34.

The first period 56 makes it possible to extract the maximum amount of air enclosed in the cavities that are present in the composite matrix. The residual air will then be compressed by the increase in pressure, and it is this that makes it possible to reduce the size of the porosities. Therefore, the less air there is enclosed at the end of the first period 56, the more possible it is to increase the pressure during the second period 58 without, however, exceeding the pressure of the autoclave, and the smaller the size of the cavities will be.

Advantageously, a neutral gas is used for the counter-pressure, for example nitrogen, so as to prevent any risk of auto-ignition and combustion.

The effectiveness of the invention is demonstrated in the following manner:

If W is the volume of porosities without counter-pressure and W' is the volume of the porosities with counter-pressure, the porosity rate is equal to W/V or W'/V, whereby V is the volume in question of the piece.

If Pint is the internal pressure in the piece during the application of the counter-pressure and Pvacuum is the pressure without counter-pressure, Pint. W'=Pvacuum.W=nRT or Pint.W'/V+Pvacuum.W/V is obtained.

Thus, the porosity rate with the counter-pressure is equal to Pvaccum/Pint×the porosity rate without counter-pressure.

Thus, if a counter-pressure of 2 bar of absolute pressure is applied, before or instead of a pressure Pvacuum=0.25 bar of absolute pressure, the porosity rate is divided by 8 relative to the process of the prior art without counter-pressure.

If a pressure Pint of 4 bar of absolute pressure is applied, after or instead of a pressure Pvacuum=0.15 bar of absolute pressure, the porosity rate is divided by 27 relative to the process of the prior art without counter-pressure.

The significant reduction of the porosity rate makes it possible to limit the exemption procedures or the discarding of pieces, which helps to make manufacturing times more predictable.

According to another point, with the porosity rate being substantially less than the acceptable limit, the elimination of the monitoring phases by ultrasound for verifying the validity of the pieces could be considered.

According to the invention, the device comprises means for producing at least one counter-pressure inside the first chamber 32.

Advantageously, the means 46 for adjusting the pressure inside the first chamber are of the reversible type and are able to produce a vacuum in said first chamber and to produce a counter-pressure with a relative value that is greater than 0 or an absolute value that is greater than 1 bar.

As a variant, the device can comprise means for generating a vacuum inside the first chamber and means for producing a counter-pressure that are separated from the means for producing the vacuum.

According to another characteristic of the invention, a counter-pressure is applied in a localized manner. Thus, the counter-pressure is applied where the porosities are likely to appear, in particular at variations of thicknesses and more particularly at projecting shapes, for example reinforcements or stiffeners as illustrated in FIG. 4.

According to one embodiment, the device comprises at least one capillary 60 that empties into the first chamber 32 at a zone at which the porosities are likely to appear.

Preferably, the capillaries 60 have a small diameter, on the order of 1 to 2 mm, and are arranged between the bladder 34 and the draining fabric 44, each for emptying, on the one hand, at a zone where the porosities are likely to appear, and, on the other hand, on the periphery of the piece at the joint.

According to another aspect, the speed with which the counter-pressure is established is to be less than on the order of 1 bar/minute in such a way as to limit an excessive pressure gradient inside of the piece that is likely to modify the arrangement of the fibers.

The invention claimed is:

1. A process for manufacturing a piece that is made of composite material that comprises fibers that are immersed in a resin matrix, whereby said process comprises the steps of:
    placing said piece (30) in a first chamber (32) with at least one flexible wall (34),
    performing a thermal cycle comprised of a first phase (50) at a first temperature during which the resin is in one of i) a liquid state, and ii) a gel state, and then a second phase (52) at a second temperature that is higher than the first during which the solidification of the piece takes place by polymerization of the resin,
    applying an external pressure to the outside of the first chamber (32), and
    reducing a porosity rate of said piece by, during the first phase (50), reducing a quantity of gas enclosed in cavities in the piece by maintaining an internal pressure of the first chamber at a relative internal pressure less than 0 during a first period (56), and then compressing residual air in the cavities in the piece by creating a counter-pressure within the first chamber by maintaining the relative internal pressure greater than 0 during a second period (58) preceding the beginning the second phase (52) of the polymerization thereby reducing a porosity rate in the piece, the counter-pressure being injected in a localized manner in the first chamber (32) at variations of a thickness in the piece where the porosities appear.

2. The process for manufacturing a piece that is made of composite material according to claim 1, wherein the counter-pressure is less than the external pressure.

3. The process for manufacturing a piece that is made of composite material according to claim 1, wherein a neutral gas is injected into the first chamber for creating the counter-pressure.

4. The process for manufacturing a piece that is made of composite material according to claim 1, wherein the counter-pressure is injected in a localized manner in the first chamber (32) at a location with a locally greater thickness in the piece.

5. A device for the implementation of the process according to claim 1, comprising a first chamber (32) with at least one flexible wall (34) in which a piece that is made of composite material that is to be produced is arranged, whereby said first chamber is arranged in a second chamber (36) in which an external pressure and a thermal cycle with essentially a first phase (50) are generated at a first temperature during which the resin is liquid or in the "gel" state, and then a second phase (52) is generated at a second temperature that is higher than the first during which the solidification of the piece takes place by the polymerization of the resin, and means for i) reducing a quantity of gas enclosed in cavities in the piece by generating a relative pressure inside said first chamber (32) that is less than 0 during a first period (56), and then ii) compressing residual air in the cavities in the piece by creating a counter-pressure within the first chamber (32) greater than 0 during a second period (58) that precedes the beginning of the polymerization for reducing the porosity rate.

6. The device according to claim 5, further comprising at least one capillary (60) for injecting the counter-pressure in a localized manner, the at least one capillary extending through the flexible wall (34).

7. The device according to claim 6, whereby said device comprises:
    a device (38), a bladder (34) that forms a flexible wall and that delimits with said device (38) a first chamber (32), and
    a draining fabric (44) that is arranged between the piece that is made of composite material and the bladder (34),
    wherein said at least one capillary (60) includes plural capillaries (60) arranged between the bladder (34) and the draining fabric (44) to empty, at least i) at a zone where the porosities are likely to appear at a location where the piece has a locally greater thickness, and ii) at the periphery of the piece that is to be produced (30).

8. The process for manufacturing a piece that is made of composite material according to claim 2, wherein a neutral gas is injected for the counter-pressure.

9. The process for manufacturing a piece that is made of composite material according to claim 2, wherein the counter-pressure is injected in a localized manner in the first chamber (32).

10. The process for manufacturing a piece that is made of composite material according to claim 3, wherein the counter-pressure is injected in a localized manner in the first chamber (32).

11. A process for manufacturing a piece that is made of composite material that comprises fibers that are immersed in a resin matrix, whereby said process comprises the steps of:
    placing the piece (30) in a first chamber (32) with at least one flexible wall (34), the first chamber (32) being arranged within a second chamber (36);
    performing a thermal cycle comprised of a first phase (50) at a first temperature during which the resin is in one of i) a liquid state, and ii) a gel state, and then a second phase (52) at a second temperature that is higher than the first during which the solidification of the piece takes place by polymerization of the resin;
    maintaining, during the first and second phases, an absolute external pressure (54) in the second chamber (36), the absolute external pressure (54) applying an external pressure to an outside of the flexible wall (34) of the first chamber (32); and
    controlling a porosity rate of the piece by, i) during a first period (56) of the first phase (50), reducing a quantity of gas enclosed in cavities in the piece by maintaining a relative internal pressure in the first chamber of less than 0, and then ii) during a second period (58) of the first phase (50), forming a counter-pressure within the first chamber by maintaining the relative internal pressure in the first chamber at greater than 0 to compress residual air in the cavities in the piece and thereby reduce a size of porosities in the piece, the counter-pressure being injected in a localized manner in the first chamber (32) at variations of a thickness in the piece where the porosities appear.

12. The process of claim 11, wherein, during said maintaining step, during the first and second phases, the absolute external pressure (54) in the second chamber (36) is a relative pressure of 7 bar.

13. The process of claim 12, wherein, the first chamber (32) with at least one flexible wall (34) is defined by a bladder opposite a rigid device (38), a periphery of the bladder being joined, at a joint (40), to the rigid device (38), and the counter-pressure is formed within the first chamber by injecting a neutral gas through the flexible wall (34).

14. The process of claim 13, comprising the further step of:

ii) during the second phase (52), maintaining the relative internal pressure in the first chamber at greater than 0 to continue compress residual air in the cavities in the piece to continue to reduce the size of porosities in the piece.

15. The process of claim 11, comprising the further step of:

ii) during the second phase (52), maintaining the relative internal pressure in the first chamber at greater than 0 to continue compress residual air in the cavities in the piece to continue to reduce the size of porosities in the piece.

16. The process of claim 11, comprising the further step of:

ii) during an entirety of the second phase (52), maintaining the relative internal pressure in the first chamber at greater than 0 to continue compress residual air in the cavities in the piece to continue to reduce the size of porosities in the piece.

17. The process of claim 15, wherein, the counter-pressure is formed within the first chamber at a location having a projecting shape with a locally greater thickness.

18. The process of claim 11, wherein, in transitioning from the first period (56) of the first phase (50) and forming the counter-pressure within the first chamber, a speed with which the counter-pressure is established is less than 1 bar/minute.

19. The process of claim 15, wherein, the counter-pressure is formed within the first chamber at a location having a projecting shape with a locally greater thickness by injecting a neutral gas through the flexible wall (34).

* * * * *